(12) United States Patent
Clupper et al.

(10) Patent No.: US 7,978,349 B1
(45) Date of Patent: Jul. 12, 2011

(54) APPARATUS AND METHOD FOR HIGH SPEED PRINTING OF FORM AND VARIABLE DATA

(75) Inventors: Charles B. Clupper, El Dorado Hills, CA (US); Frank W Delfer, Granite Bay, CA (US)

(73) Assignee: DST Output, El Dorado Hills, CA (US)

( * ) Notice: Subject to any disclaimer, the term of this patent is extended or adjusted under 35 U.S.C. 154(b) by 1147 days.

(21) Appl. No.: 11/412,374

(22) Filed: Apr. 27, 2006

(51) Int. Cl.
*B41J 2/001* (2006.01)
*G06K 3/012* (2006.01)
*B41J 2/021* (2006.01)

(52) U.S. Cl. ............. 358/1.13; 347/42; 347/49; 347/13; 347/102; 347/43; 358/1.12; 358/1.15; 358/1.16; 358/1.17; 358/1.18; 101/2; 101/393; 101/392; 101/485; 101/486; 101/87

(58) Field of Classification Search ........ 358/1.11–1.18, 358/1.9, 401, 448, 474, 497, 3.02, 3.03, 3.23; 347/101–105, 2–5, 16, 43, 42, 49, 13; 101/485–491, 101/494, 2, 185, 182, 87, 393, 392; 271/185; 283/106; 715/200, 247; 709/201; 707/200
See application file for complete search history.

(56) References Cited

U.S. PATENT DOCUMENTS

| | | | |
|---|---|---|---|
| 3,911,818 A * | 10/1975 | MacIlvaine | 101/494 |
| 5,677,719 A | 10/1997 | Granzow | |
| 5,784,077 A | 7/1998 | Silverbrook | |
| 5,995,196 A | 11/1999 | Nishida et al. | |
| 6,148,724 A * | 11/2000 | Hart et al. | 101/182 |
| 6,375,296 B1 * | 4/2002 | McGarry et al. | 347/13 |
| 6,402,132 B1 * | 6/2002 | Michaelis et al. | 270/1.01 |
| 6,402,136 B1 * | 6/2002 | Lamothe | 271/185 |
| 6,895,549 B1 * | 5/2005 | Albright et al. | 715/247 |
| 6,896,354 B1 | 5/2005 | Uchisako et al. | |
| 2002/0154182 A1 | 10/2002 | Takahashi et al. | |
| 2002/0180815 A1 | 12/2002 | Nou | |
| 2004/0066441 A1 | 4/2004 | Jones et al. | |
| 2005/0151999 A1 * | 7/2005 | Inikori | 358/1.18 |
| 2005/0206678 A1 * | 9/2005 | Nishino | 347/43 |
| 2006/0087113 A1 * | 4/2006 | Snyder et al. | 283/106 |
| 2006/0279788 A1 * | 12/2006 | Crounse et al. | 358/3.03 |

* cited by examiner

*Primary Examiner* — Chan S Park
*Assistant Examiner* — Chad Dickerson
(74) *Attorney, Agent, or Firm* — James M. Ritchey

(57) ABSTRACT

A web platform has multiple print modules adapted to print form data and variable data in a continuous operation. A controller with access to a form image database and a variable document database is connected to the web platform. Each print module on the web platform uses single color, ink jet, print heads. Form data is printed by a plurality of single color print modules. Variable data is printed by a single color print module. Bulk paper in rolls is fed through the web platform to print the forms and customer statements. The controller can direct printing of multiple statements simultaneously in discrete lanes on the web platform. Printed customer statements are subsequently separated into individual finished documents for process and mailing.

20 Claims, 3 Drawing Sheets

APPARATUS AND METHOD FOR HIGH SPEED PRINTING OF FORM AND VARIABLE DATA

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to printing form and variable data, and more particularly to high speed printing of form and variable data in a single operation.

2. Description of Related Art

Documents such as a billing statement or account statement have two components; the form containing the same image on every sheet and the variable data such as customer data which has different information on every sheet. Form images may include multiple color graphics and indicia such as a company logo or lines for summation or detachment, or alpha numeric information such as company name or payment instructions. Variable customer data is unique for each sheet of a document or customer statement and may be customer account information, a summary of use or calculation of charges. Variable data is typically printed in a single color such as black. The number of sheets in a customer statement or document can vary. A typical customer statement is about 1 to 16 sheets but in exceptional cases can be over 100 sheets or even 1,000 sheets.

FIG. 1 illustrates an existing process 10 for preparing customer statements and documents. A bulk roll of paper 12, typically 36 inches wide, is fed through offset web press 14 to print form information. An offset press has a platform that handles bulk paper and separate print modules with each module having an offset plate for a unique color. An example is an offset press with four print modules set up as a four color CMYK process printer. Another example is an offset press with multiple spot color print modules. High speed offset web press 14 can produce color forms at the rate of 1000 feet per minute since the image to be printed by each module remains the same for all forms. Because most offset printing is done using water and ink on plates, additional equipment for drying the paper and setting the ink is required (not shown). An example of equipment used for this purpose is a Didde D-900 web press or a Zirkon 7221 web press.

Forms are typically printed two to four across on offset web press 14. The paper is then fed through a slitter winder 16 where the printed forms are wound on narrow rolls 18. These printed form rolls are then handled, stored and transported at block 20 with associated handling costs. Printed forms may also be processed and handled as fanfold stacks. In many operations, printed form rolls 18 are prepared by outside vendors and shipped to the document processing center. An inventory of printed form rolls 18 for each client is typically stored in a controlled environment at the statement processing center prior to printing customer statements.

At the statement processing center, printed form roll 18 is taken from storage and unwound at block 22 and fed through a single color variable data printer 24. A controller 26 is connected to a variable customer database 28 and printer 24. Controller 26 accesses customer database 28 and directs variable data printer 24 to print variable customer data on the forms. The customer data is usually printed in black with a high speed laser printer. A typical high speed laser printer can print medium quality (300 dpi) variable data at speeds up to about 250 feet per minute. An example of this equipment is an IBM Infoprint 4000 or an Oce VarioStream 7000 printer. The speed of the laser printer 24 is limited because the image printed on each form sheet is unique and the number of sheets in each customer statement varies. Also the laser printer prints the customer statements consecutively one sheet at a time.

The customer statements from printer 24 are typically prepared for further processing by stacker 26 to form stacks of fanfold customer statements 28. The remaining steps of cutting customer statements into sheets, collating and inserting into envelopes for mailing is not illustrated in FIG. 1.

A conventional desktop ink jet printer using CMYK cartridges on a scanning print head is capable of printing color form images and variable data simultaneously, but prints much slower than laser printers because the print head must scan the entire sheet to print both form images and variable customer data. This results in a slower process and much higher cost per customer statement than using high speed laser printers.

A high speed laser printer can be configured to print additional spot color such as a logo or line, but the speed is still limited to that of a laser printer.

A digital offset press can be configured to print form and variable data, but the cost of operation is very high and the throughput, in the range of about 10,000 documents per hour, is too slow for production statement printing.

What is needed is a high speed printing apparatus and method for producing multiple color form images and single color variable customer data in a combined process to increase printing speed and reduce handling and storage costs for forms and customer statements.

BRIEF SUMMARY OF THE INVENTION

A web platform is equipped to handle bulk paper in wide rolls and has multiple print modules adapted to print form data and variable data in a single operation. A controller with access to a form image database and a variable document database with variable data such as customer data is connected to the web platform. Each print module on the web platform uses single color, ink jet, print heads. Variable data is printed on a black print module. Bulk paper in rolls is fed through the web platform to print the forms and variable data statements. The controller can direct printing of multiple statements or documents simultaneously in discrete lanes on the web platform. Finished documents are subsequently separated into individual stacks for processing and mailing.

An embodiment of the invention is an apparatus for printing form data and variable data on suitable media in a continuous operation to form a document that comprises a controller, a form database connected to the controller having data that establishes the form data printed on each form, a variable document database connected to the controller having data that establishes the variable data printed on a document, a web platform connected to the controller, where the web platform is adapted to receive the suitable media, means for printing form data coupled to the web platform, where the means for printing form data is connected to the controller, where the controller has access to the form database to direct the means for printing form data to print form data on the suitable media, means for printing variable data coupled to the web platform, where the means for printing variable data is connected to the controller, where the controller has access to the variable document database to direct the means for printing variable data to print variable data on the suitable media, and where the printed form data and the printed variable data combine to form a document.

An aspect of the invention is where the means for printing form data comprises a plurality of print modules coupled to the web platform, where each print module is connected to the controller, where each print module has a plurality of fixed, ink jet print heads, and where each print module is adapted to print a single color of ink.

Another aspect of the invention is where the spacing between the print modules is independent of the length of the form.

A further aspect of the invention is where the means for printing variable data comprises at least one print module coupled to the web platform, where the print module is connected to the controller, where the print module has a plurality of fixed, ink jet print heads, and where the print module is adapted to print a single color of ink.

A still further aspect of the invention is where the suitable media is roll paper.

Another aspect of the invention is a sheet cutter, a roll winder or a fanfold stacker coupled to the web press platform.

A further aspect of the invention is where the web platform is adapted to print statements in a plurality of lanes, and where the controller is adapted to direct the means for printing form data and the means for printing variable data to print a document in each lane simultaneously.

A still further aspect of the invention is a slitter coupled to the web platform, where the slitter is adapted to separate each lane of statements.

Another embodiment of the invention is an apparatus for printing form data and variable data on suitable media in a continuous operation to form a document that comprises a controller, a form database connected to the controller having data that establishes the form data printed on each form, a variable document database connected to the controller having data that establishes the variable data printed on a document, a web platform connected to the controller, where the web platform is adapted to receive the suitable media, a plurality of print modules coupled to the web platform, where the plurality of print modules are connected to the controller, where each the print module has a plurality of fixed, ink jet print heads, where each the print module is adapted to print a single color of ink, where the controller has access to the form database to direct at least one of the plurality of print modules to print form data on the suitable medium, where the controller has access to the variable document database to direct at least one of the plurality of print modules to print variable data on the suitable media, and where the printed form data and the printed variable data combine to form a document.

An aspect of the invention is where at least one print module is selected by the controller to print variable data.

Another aspect of the invention is where the spacing between the plurality of print modules is independent of the length of the form.

A further aspect of the invention is where the suitable media is roll paper.

A still further aspect of the invention is where the web platform is adapted to print documents in a plurality of lanes, and where the controller is adapted to direct the plurality of print modules to print form data and variable data in each lane simultaneously.

Another aspect of the invention is where the plurality of ink jet print heads are fixed in a staggered and overlapped configuration.

Another embodiment of the invention is a method for printing form data and variable data on suitable media in a continuous operation to form a document that comprises providing a web platform adapted to receive the suitable media, providing a plurality of single color print modules coupled to the web platform, where each print module has a plurality of fixed ink jet print heads, providing a controller connected to the plurality of print modules and the web platform, providing a form database and a variable document database connected to the controller, accessing the form database with the controller and directing at least one of the plurality of print modules to print form data, accessing the variable document database with the controller and directing at least one of the plurality of print modules to print variable data, and forming a document by combining the printed form data and the printed variable data.

A further aspect of the invention is selecting at least one print module by the controller to print variable data.

A yet further aspect of the invention is adapting the controller and the web platform to print statements in a plurality of lanes, and directing the plurality of print modules to print form data and variable data in each lane simultaneously.

Another aspect of the invention is providing a slitter coupled to the web platform, and separating each lane of statements with the slitter.

A further aspect of the invention is providing a sheet cutter, a roll winder or a fanfold stacker coupled to the web press platform.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
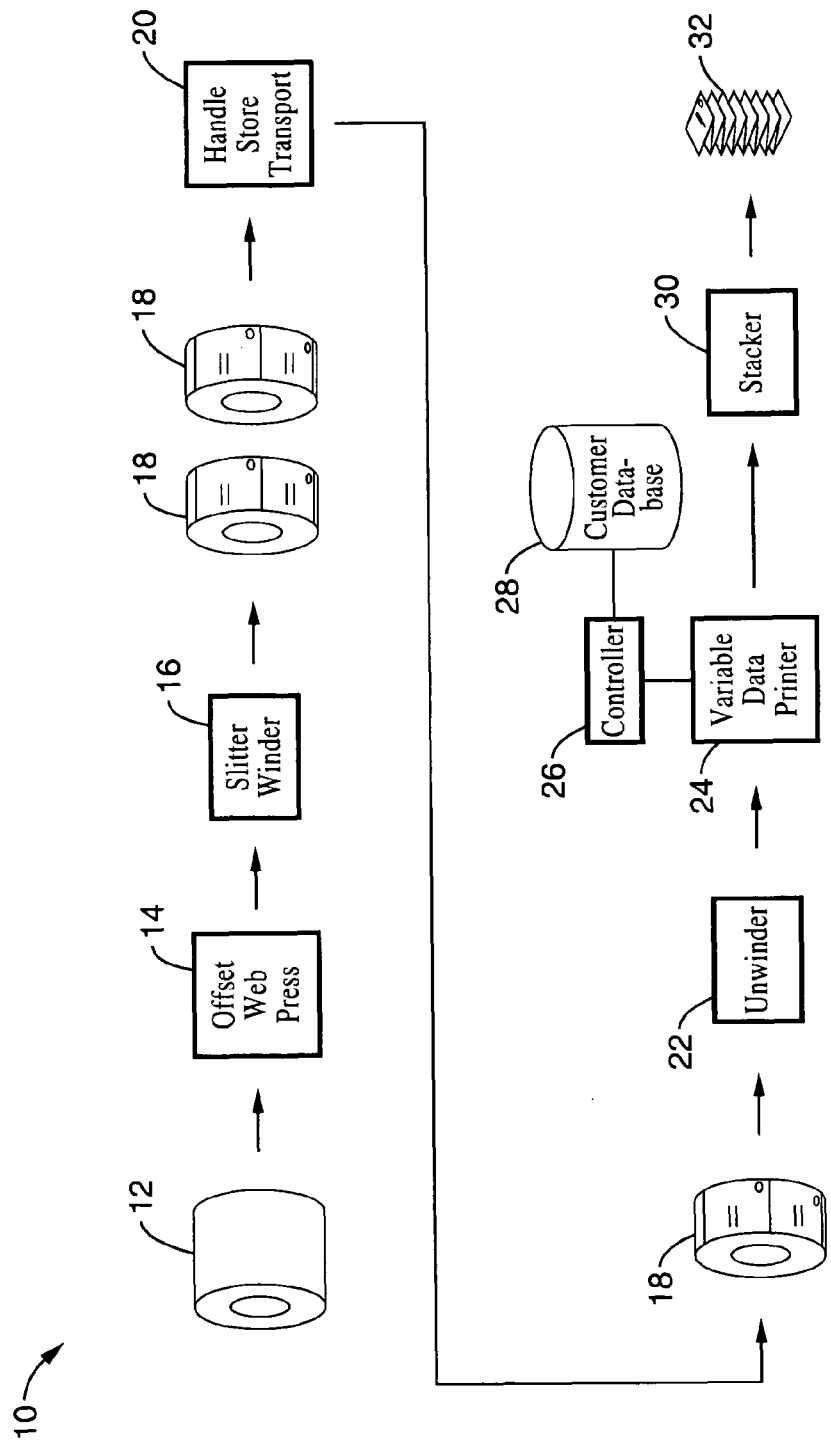
FIG. 1 is a schematic view of an existing process for printing forms and preparing customer statements using an offset web press, a laser printer and associated paper handling equipment.
Figure 2:
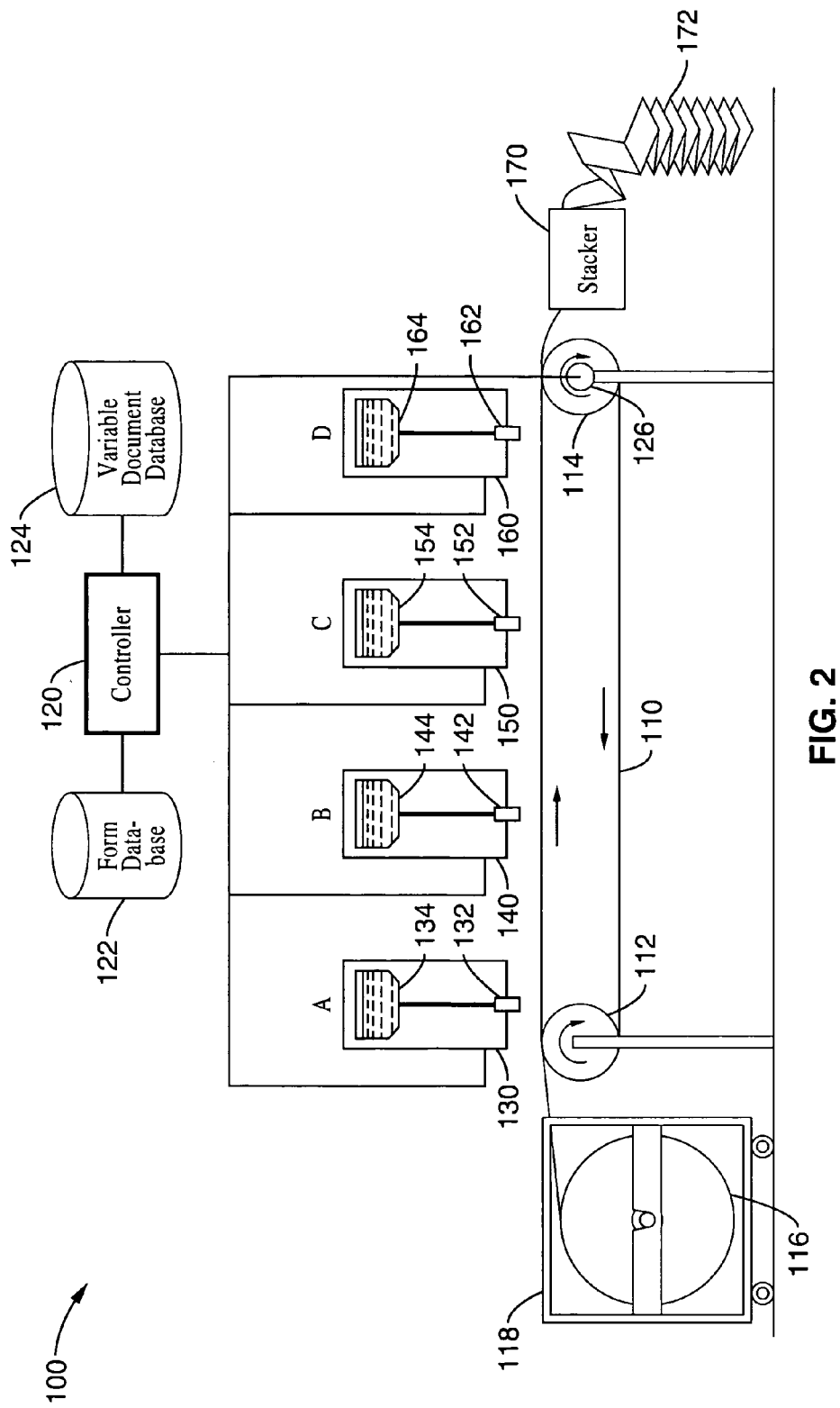
FIG. 2 is a schematic view of a web platform configured with multiple print modules to print form and variable data simultaneously.
Figure 3:
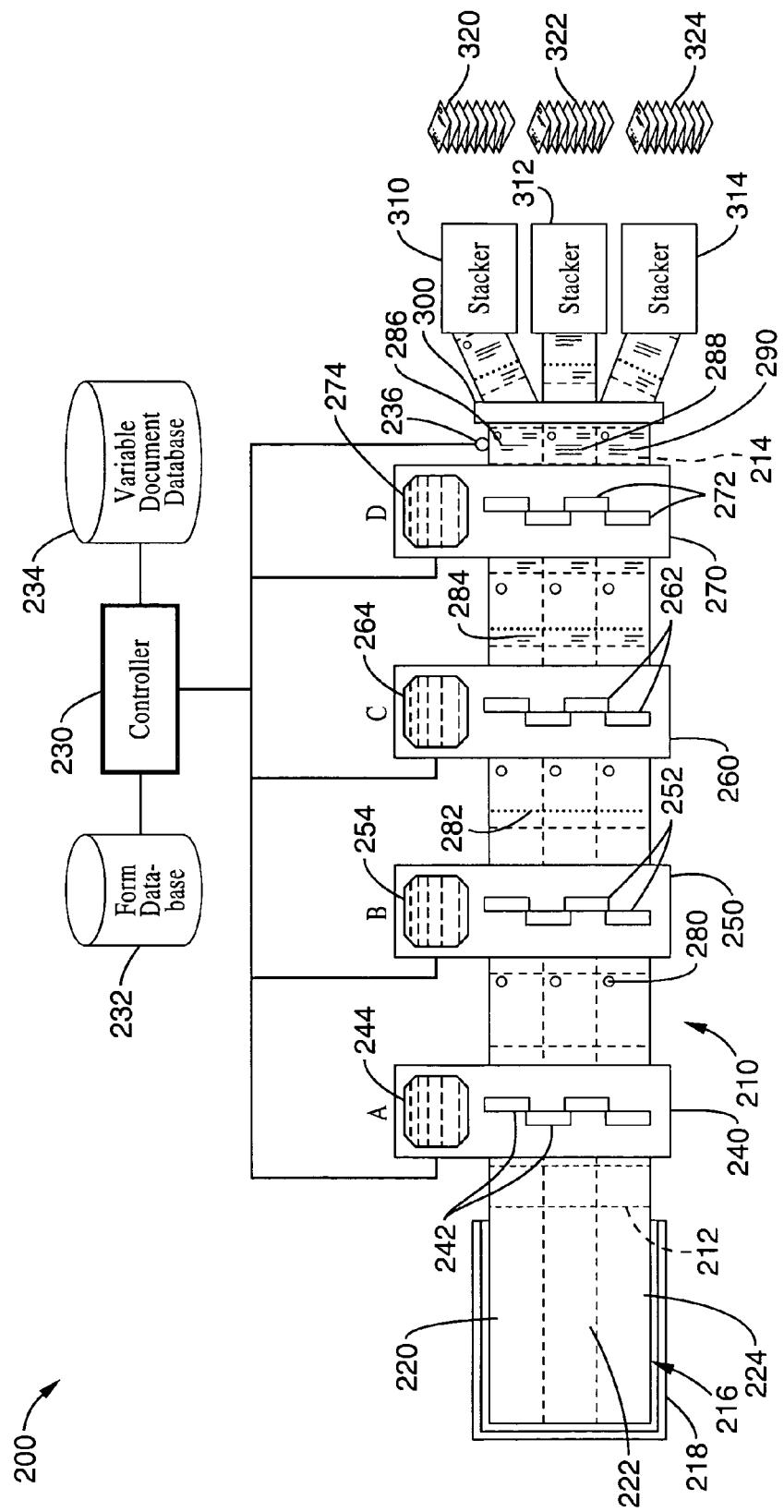
FIG. 3 is a schematic plan view of a web platform configured to print multiple lanes of statements and with multiple print modules to print form and variable data simultaneously.

Referring more specifically to the drawings, for illustrative purposes the present invention is embodied in the apparatus generally shown in FIG. 2 through FIG. 3. It will be appreciated that the apparatus may vary as to configuration and as to details of the parts, and that the method may vary as to the specific steps and sequence, without departing from the basic concepts as disclosed herein.

FIG. 2 illustrates a schematic view of a document printing system 100 for preparing documents and customer statements having multiple color form data and single color variable data in a continuous operation. A web platform 110, is represented schematically by a continuous belt with front roller 112 and back roller 114. Web platform 110 is adapted to receive bulk paper 116 in roll form shown supported in carrier 118. In one embodiment, web platform 110 is adapted from an existing web offset press. While roll paper is preferred, any suitable media for creating or printing documents including fanfold or single sheet media can be used.

A controller 120 has access to a form database 122 and a variable document database 124. Form database 122 has information such as logo, indicia, and instructions that are to be printed on every sheet of a customer statement. Variable document database 124 has information about the variable data to be printed on a document or customer statement such as customer identity, summary of usage or billing calculations. Each sheet of a document will have unique variable data and each finished document will have a unique number of sheets depending on the quantity and type of variable data for a particular customer. A typical finished document ranges from one sheet to about 16 sheets but in exceptional cases can be over 1,000 sheets.

Controller 120 is connected to web platform 110 through speed sensor/controller 126, shown at back roller 114, to coordinate printing alignment, registration and timing.

Controller 120 is also connected to a plurality of print modules mounted on web platform 110. First print module 130 is equipped with one or more single color ink jet print heads 132 that extends the width of paper 116. An ink reservoir 134 supplies color A to print head 132. Second print module 140 is similarly equipped with ink jet print heads 142 and ink reservoir 144 that supplies color B. Third print module 150 has ink jet print heads 152 and ink reservoir 154 with color C and fourth print module 160 has ink jet print heads 162 and ink reservoir 164 with color D. In one embodiment, colors A, B, C and D correspond to cyan, magenta, yellow and black ink typically used in a CMYK process printer.

In other embodiments, colors A, B and C represent unique or spot colors specified by the client for the form. Using spot color eliminates the requirement to use multiple print modules to print one color. Additional print modules, each with a unique spot color, can be used to accommodate form color requirements of several different clients on the same web platform. This ability to add spot color print modules increases flexibility of a web platform and save set up time between client runs.

In one embodiment, first, second and third print modules 130, 140 and 150 are directed by controller 120 to print form data such as company logo and indicia in colors A, B and C. Fourth print module 160 is directed by controller 120 to print variable document data in color D. Because the print heads generally span the width of paper 116 (as shown in FIG. 3), there is no horizontal scanning of the print head and a high speed printing process is realized. In another embodiment of the invention, fourth print module 160 is directed by controller 120 to print both form data and variable data in Color D. In a further embodiment of the invention, controller 120 directs select variable data to be printed in color A, B or C. An example would be a negative balance on a billing statement printed in red.

In one embodiment, a stacker 170 receives the finished documents from web platform 110 and stacks them into fanfold stacks 172 ready for further processing. In other embodiments, the finished documents from web platform 110 are received on a roll winder or cut into individual sheets by a sheet cutter or sheeter and collated without fanfold stacking.

Handling and storage of many different preprinted forms is replaced by bulk storage and use of blank paper rolls at the statement processing center. This can result in considerable savings in handling and storage when many different clients each use unique forms for documents and customer statements.

FIG. 3 is a plan view schematic of another embodiment of a printing system 200 for high speed printing of customer statements and documents having multiple color forms and single color variable data in a continuous operation. Printing system 200 is configured to print on a web platform 210 represented by an endless belt with front roller 212 and back roller 214 (shown in hidden line). A wide roll of paper 216 is supported by carrier 218 and positioned to feed web platform 210 at front roller 212. While roll paper is preferred, any suitable media for creating or printing documents including individual or fanfold sheets may be used. Multiple documents can be printed simultaneously across the nominal width of paper 216, typically two to four or more documents wide. In FIG. 3, web platform 210 is configured with three lanes, designated left lane 220, middle lane 222 and right lane 224. All three lanes are used to print documents or customer statements simultaneously. For clarity, dashed lines are shown running the length of web platform 210 that divide paper 216 in thirds and designate the division of the three lanes 220, 222, and 224 respectively.

A controller 230 has access to a form database 232 and a variable document database 234. Form database 232 has information such as logo, indicia, and instructions that are to be printed on each sheet. Variable document database 234 has information about the variable data to be printed on a document such as a customer statement, summary of usage or billing calculations. Each sheet of a document will have unique variable data and each document in each lane will have a unique number of sheets depending on the quantity of variable data for a particular finished document. A typical finished document ranges from one sheet to about 16 sheets.

In one embodiment, controller 230 processes the variable data from variable document database 234 prior to printing to: (a) determine the number of sheets in the finished document, (b) order the document sheets and (c) determine which document will be printed in each lane. Typically, all the sheets of a particular finished document will be printed consecutively in one lane.

Controller 230 is connected to web platform 210 through speed sensor/controller 236 at back roller 214 in order to coordinate printing alignment, registration and timing.

Controller 230 is also connected to a plurality of print modules mounted on web platform 210. First print module 240 is equipped with a plurality of single color ink jet print heads 242 mounted to nominally cover the width of paper 216. In this illustration, print heads 242 are aligned across the nominal width of paper in a staggered and overlap configuration so the nozzles on print heads 242 provide complete coverage with no gaps between print heads 242. The number of print heads is determined by the nominal width of the web platform and most economical print head size and does not necessarily match the number of lanes. For example, four, nominal nine-inch wide print heads can be used to print three lanes or four lanes across 36 inch wide paper. The position of each print module relative to the web platform 210 is determined in controller 230. The position of each print head 242 relative to a reference position of each print module is determined in controller 230 or in an intermediate processor (not shown) in print module 240. An ink reservoir 244 supplies color A to print head 242. The supply lines from ink reservoir 244 to print heads 242 are not shown for clarity.

Second print module 250 is similarly equipped with ink jet print heads 252 and ink reservoir 254 that supplies color B. Third print module 260 has ink jet print heads 262 and ink reservoir 264 with color C and fourth print module 270 has ink jet print heads 272 and ink reservoir 274 with color D. In one embodiment, colors A, B, C and D correspond to cyan, magenta, yellow and black ink such as used in a CMYK process printer. In other embodiments, colors A, B and C represent unique spot colors specified by the client for the document forms. Additional print modules, each with a unique spot color, can be used to accommodate form color requirements of several different clients on the same web platform. Unlike a traditional offset web press, the spacing of print modules 240, 250, 260 and 270 using ink jet technology does not depend on the signature or length of the form. Print modules can be positioned tightly to add more modules or save space. Also, print modules can be spaced farther apart if desired to provide additional drying time for the ink. In a further embodiment, a heat source can be placed after any or all print modules to accelerate ink drying.

FIG. 3 also illustrates a printing sequence for printing system 200. Controller 230 processes form information from form database 232 and directs print module 240 to print a logo 280 in color A on each form. As the forms move from left to right, controller 230 directs print module 250 to print a dotted line 282 in color B for stub detachment on each form. Print module 260 is then directed to print a return mailing address in color C on the stub of each form. In the next step, controller 230 accesses information from variable document database 234 and directs print module 270 to print three sheets of variable data simultaneously in color D. The three sets of variable data are designated 286, 288 and 290.

In a further embodiment, controller 230 accesses form database 232 and directs print module 270 to print form data in color D simultaneous with variable data. In a still further embodiment, select variable data is directed by controller 230 to be printed in color A, B or C. An example would be a negative balance on a billing statement printed in red.

A slitter 300 is positioned after back roller 214 of web platform 210 and splits the three lanes of documents. Stackers 310, 312 and 314 fanfold the three lanes of documents received from slitter 300. Three fanfold stacks of documents, 320, 322 and 324 are now ready for collating into finished documents, inserting and mailing. In another embodiment, stackers 320, 322 and 324 are replaced with roll winders or sheet cutters also known as sheeters.

FIG. 3 illustrates documents 320, 322 and 324 printed in a head-to-toe configuration. Other configurations, such as side-to-side and head-to-head are available with the invention and are not illustrated. In examples where finished documents are a uniform number of sheets, the sheets of a finished document may be printed across lanes simultaneously.

The time and number of steps required to print documents is shortened considerably by the novel combination of printing form and variable data simultaneously and printing multiple lanes of statements in a single continuous process. Printing speeds comparable with traditional offset presses printing fixed images are possible for customer statements and documents with color form data and variable data. Additionally, handling and storage of many different preprinted forms is replaced by bulk storage and use of blank paper rolls at the statement processing center. This can result in considerable savings in handling and storage when many different clients each use unique forms for customer statements.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for printing form data and variable data on suitable media in a continuous operation to produce a document having one or more sheets, comprising:
   a) a controller;
   b) a form database connected to said controller having data that establishes the form data printed on each document;
   c) a variable document database connected to said controller having data that establishes the variable data printed on each document;
   d) a web platform connected to said controller;
      wherein said web platform is configured to receive said suitable media;
   e) means for printing form data coupled to said web platform,
      wherein said means for printing said form data comprises:
         a plurality of form print modules coupled to said web platform with spacing between each said form print module that is independent of the length of the document,
      said form print modules can be positioned tightly together in order to add more modules or save space or spaced further apart to provide additional drying time for the ink;
      wherein each said form print module is connected to said controller and a position for each said form print module, relative to said web platform, is determined by said controller, wherein each said form print module has a plurality of fixed, ink jet print heads that together span the width of each of said sheets, and wherein each said form print module is configured to print a single color of ink;

wherein said controller has access to said form database to direct said means for printing form data to print form data on said suitable media; and f) means for printing variable data coupled to said web platform, wherein said means for printing said variable data comprises:

at least one variable data print module coupled to said web platform with a spacing between said variable data print module and each said form print module that is independent of the length of the form, said at least one variable data print module and said form print module can be positioned tightly together in order to add more modules or save space or spaced further apart to provide additional drying time for the ink;

wherein said variable data print module is connected to said controller and a position for said variable print module, relative to said web platform, is determined by said controller, wherein said variable data print module has a plurality of fixed, ink jet print heads that together span the width of each of said sheets, wherein said variable data print module is configured to print a single-color of ink;

wherein said controller processes the variable data from said variable document database to determine the number of sheets in a the document;

wherein each said sheet has unique variable data;

wherein said controller has access to said variable document database to direct said means for printing said variable data on said suitable media;

wherein said printed form data and said printed variable data combine to form a sheet; and wherein said number of sheets are combined to form the document.

2. An apparatus as recited in claim 1, wherein said web platform is configured to print documents in a plurality of lanes; and wherein said controller is configured to determine which document will be printed in each lane.

3. An apparatus as recited in claim 1, wherein said suitable media is roll paper.

4. An apparatus as recited in claim 3, further comprising: a sheet cutter, a roll winder or a fanfold stacker coupled to said web press platform.

5. An apparatus as recited in claim 3: wherein said web platform is configured to print documents in a plurality of lanes; and wherein said controller is configured to direct said means for printing form data and said means for printing variable data to print a document in each lane simultaneously.

6. An apparatus as recited in claim 5, further comprising: a slitter coupled to said web platform;

wherein said slitter is configured to separate each lane of documents.

7. An apparatus for printing form data and variable data on suitable media in a continuous operation to produce a document having one or more sheets, comprising:

a) a controller;

b) a form database connected to said controller having data that establishes the form data printed on each document;

c) a variable document database connected to said controller having data that establishes the variable data printed on each document;

d) a web platform connected to said controller;

wherein said web platform is configured to receive said suitable media; and e) a plurality of print modules coupled to said web platform with spacing between each said print module that is independent of the length of the document;

said print modules can be positioned tightly together in order to add more modules or save space or spaced further apart to provide additional drying time for the ink;

wherein said plurality of print modules are connected to said controller and a position for each said print module, relative to said web platform, is determined by said controller;

wherein each said print module has a plurality of fixed, ink jet print heads that together span the width of each of said sheets;

wherein each said print module is configured to print a single color of ink;

wherein said plurality of ink jet print heads is fixed in a staggered and overlapped configuration to span the width of each said sheet;

wherein said controller processes the variable data from said variable document database to determine the number of sheets in each document;

wherein each sheet has unique variable data; wherein said controller has access to said form database to direct at least one of said plurality of print modules to print form data on said suitable medium;

wherein said controller has access to said variable document database to direct at least one of said plurality of print modules to print variable data on said suitable media;

wherein said printed form data and said printed variable data combine to form a sheet; and wherein said number of sheets are combined to form the document.

8. An apparatus as recited in claim 7, wherein at least one print module is selected by said controller to print variable data.

9. An apparatus as recited in claim 7, wherein said web platform is configured to print documents in a plurality of lanes; and wherein said controller is configured to determine which document will be printed in each lane.

10. An apparatus as recited in claim 7, wherein said suitable media is roll paper.

11. An apparatus as recited in claim 10, wherein said web platform is configured to print documents in a plurality of lanes; and wherein said controller is configured to direct said plurality of print modules to print form data and variable data in each lane simultaneously.

12. An apparatus as recited in claim 11, further comprising: a slitter coupled to said web platform; wherein said slitter is configured to separate each lane of documents.

13. An apparatus as recited in claim 12, further comprising a sheet cutter, a roll winder or a fanfold stacker coupled to said web press platform.

14. A method for printing form data and variable data on suitable media in a continuous operation to produce a document having one or more sheets comprising:

a) providing a web platform configured to receive said suitable media;

b) providing a plurality of fixed single color print modules coupled to said web platform and having spacing between each said print module that is independent of the length of the document;
wherein each print module has a plurality of fixed ink jet print heads that together span the width of each of said sheets;
wherein said plurality of ink jet heads is fixed in a staggered and overlapping configuration to span the width of each said sheet;
  said print modules can be positioned tightly together in order to add more modules or save space or spaced further apart to provide additional drying time for the ink;
c) providing a controller connected to said plurality of print modules and said web platform, wherein a position for each said form print module, relative to said web platform, is determined by said controller;
d) providing a form database and a variable document database connected to said controller;
e) accessing said variable document database with said controller to process variable data to determine the number of sheets in a the document; wherein each sheet has unique variable data;
f) accessing said form database with said controller and directing at least one of said plurality of print modules to print form data;
g) accessing said variable document database with said controller and directing at least one of said plurality of print modules to print variable data;
h) forming a sheet by combining said printed form data and said printed variable data; and
i) combining said number of sheets to form the document.

15. A method as recited in claim 14, comprising selecting at least one print module by said controller to print variable data.

16. A method as recited in claim 14, wherein said controller and said web platform are configured to print documents in a plurality of lanes; and
  determining which document will be printed in each lane by said controller.

17. A method as recited in claim 14, wherein said suitable media is roll paper.

18. A method as recited in claim 17:
  wherein said controller and said web platform are configured to print documents in a plurality of lanes; and
  directing said plurality of print modules to print form data and variable data in each lane simultaneously.

19. A method as recited in claim 18, further comprising:
  providing a slitter coupled to said web platform; and
  separating each lane of documents with said slitter.

20. A method as recited in claim 19, further comprising:
  providing a sheet cutter, a roll winder or a fanfold stacker coupled to said web press platform.

\* \* \* \* \*